Feb. 2, 1943.  A. L. KOCH ET AL  2,309,735
VEHICLE CONSTRUCTION
Filed April 26, 1940  7 Sheets-Sheet 1
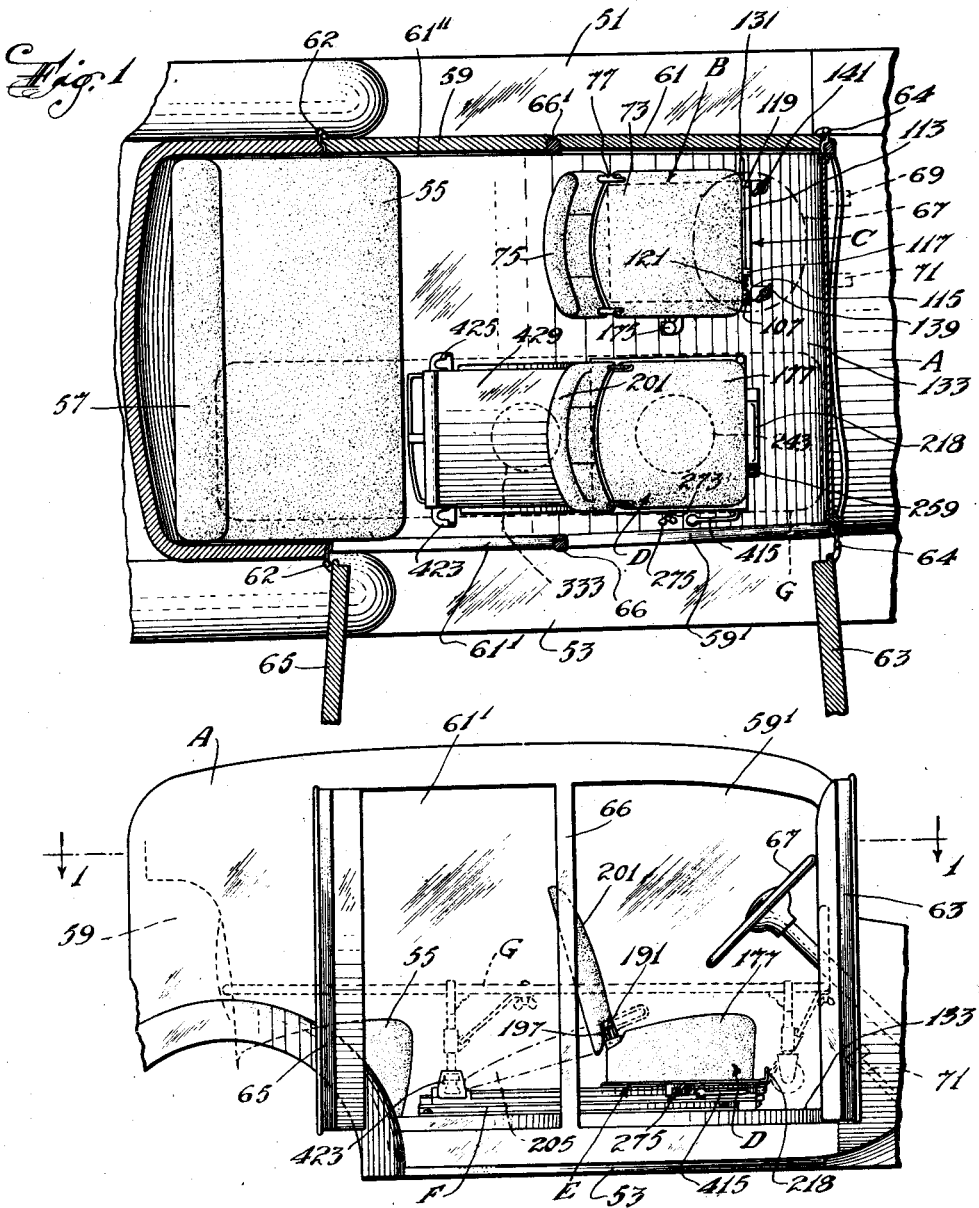
INVENTORS
Arthur L. Koch,
John B. Covi
BY
Bonnfard Hamilton
ATTORNEY

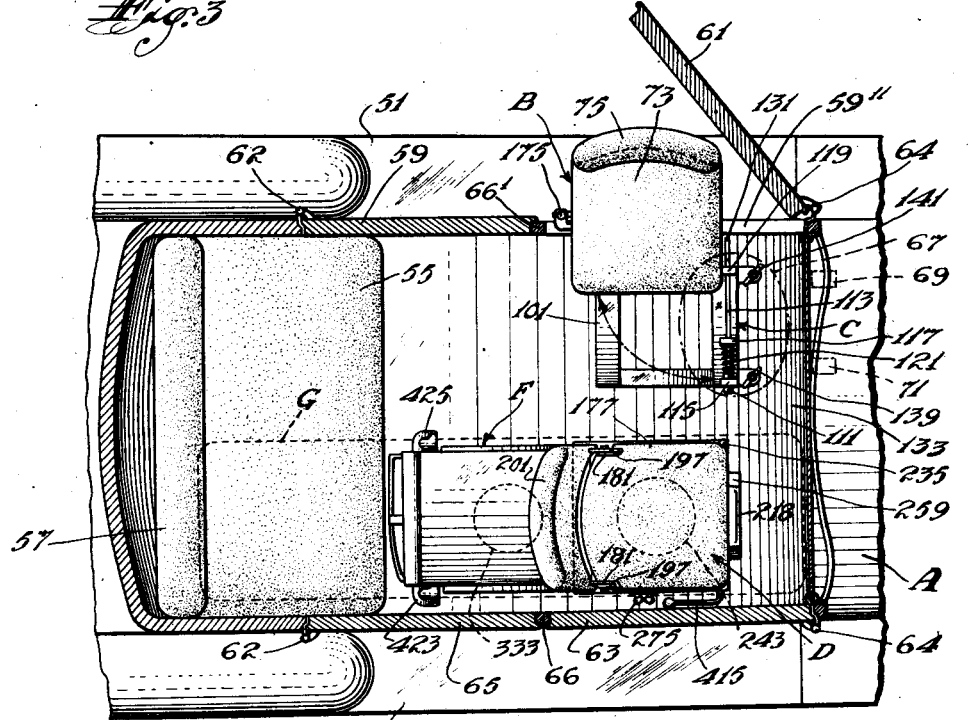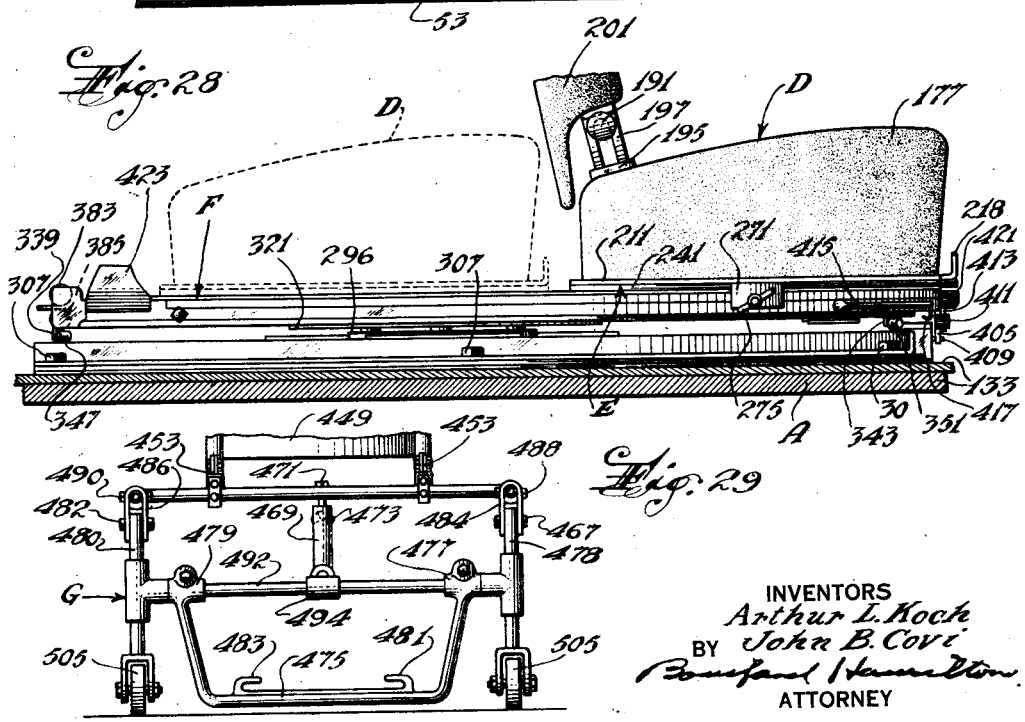

Feb. 2, 1943.　　A. L. KOCH ET AL　　2,309,735
VEHICLE CONSTRUCTION
Filed April 26, 1940　　7 Sheets-Sheet 3
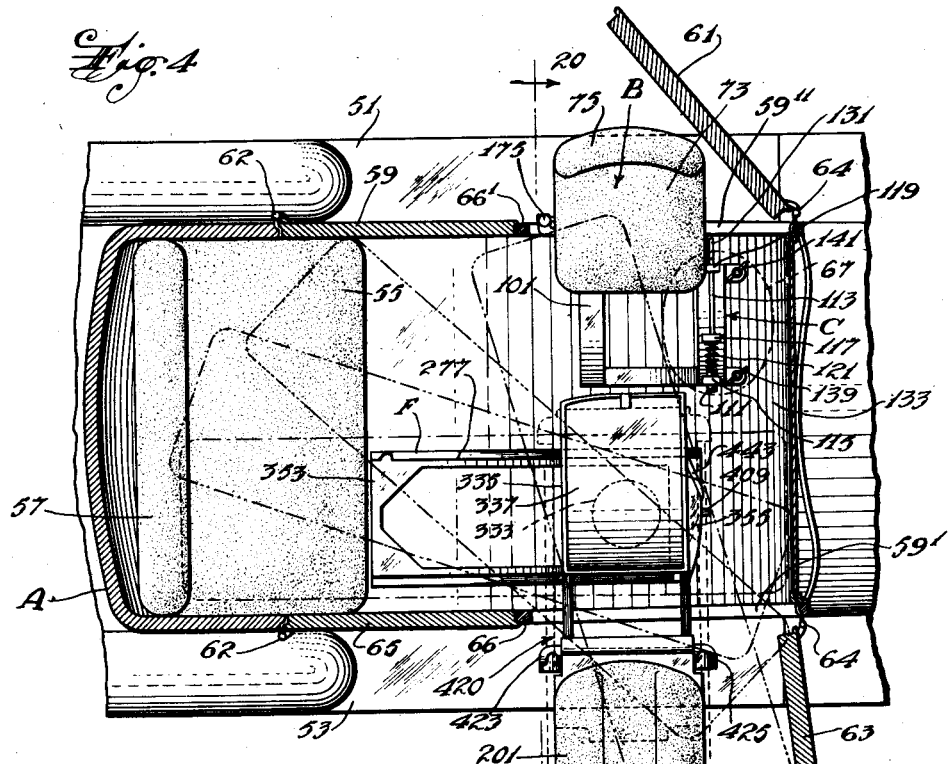
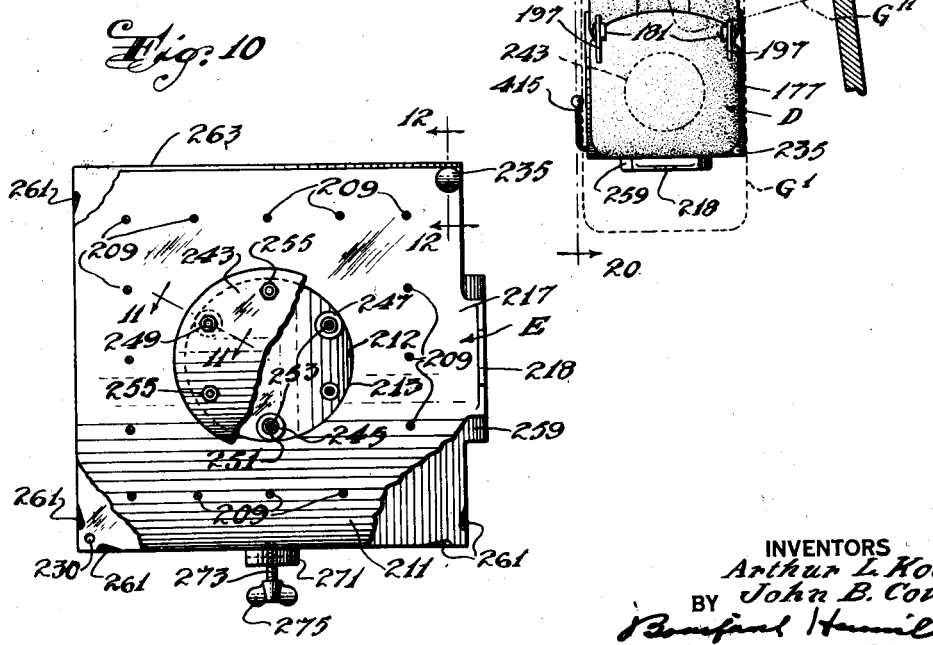
INVENTORS
Arthur L. Koch
BY John B. Covi
ATTORNEY

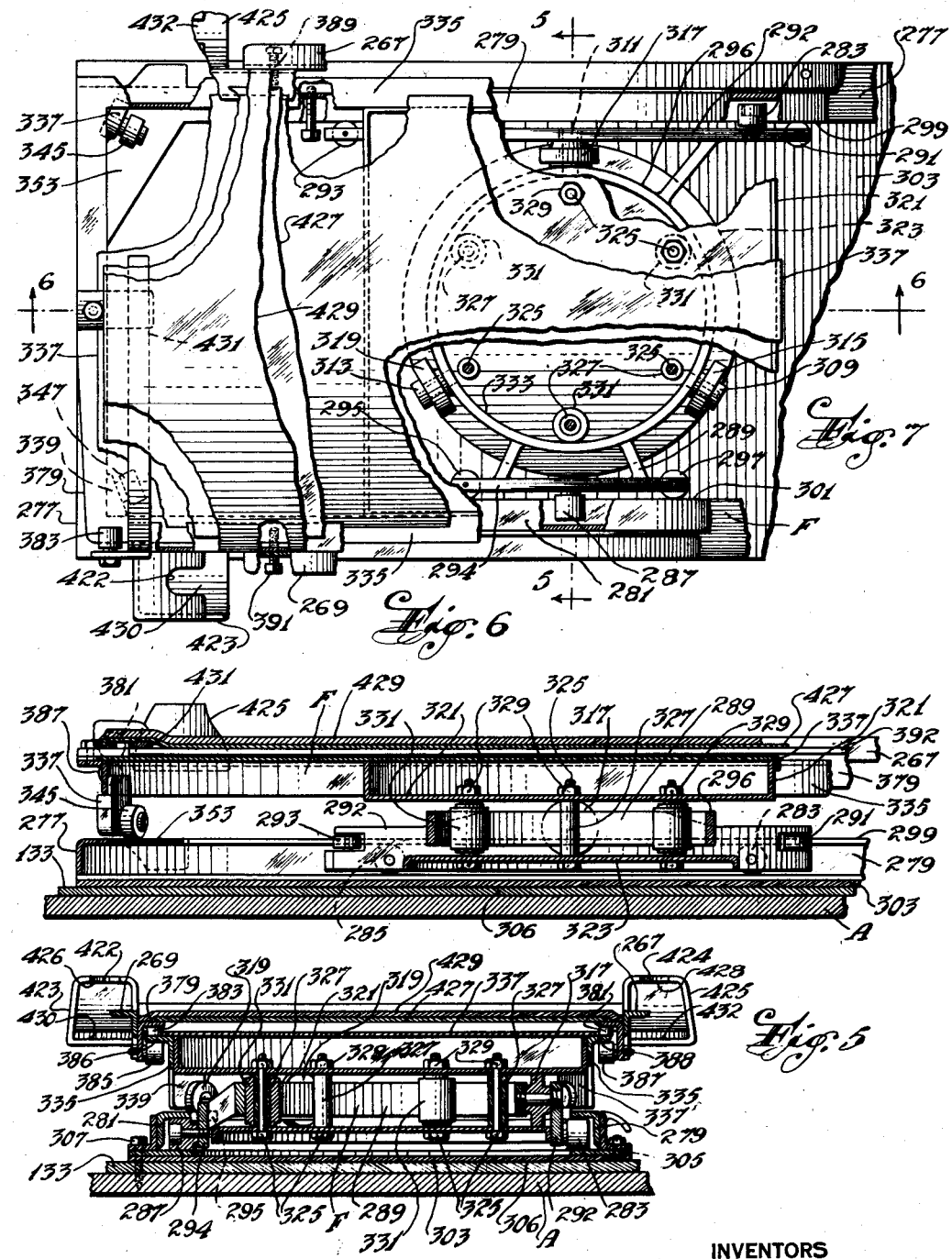

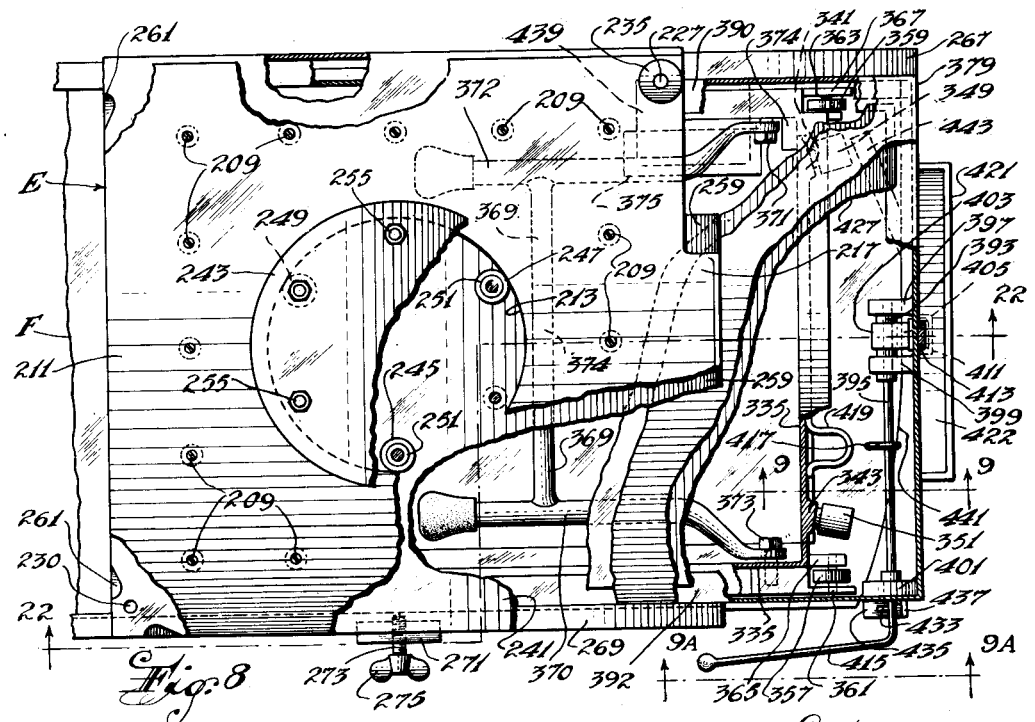
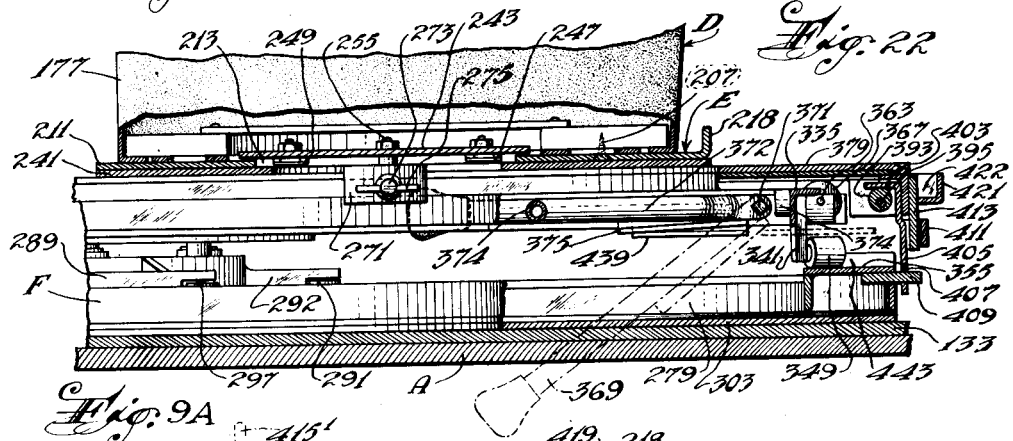
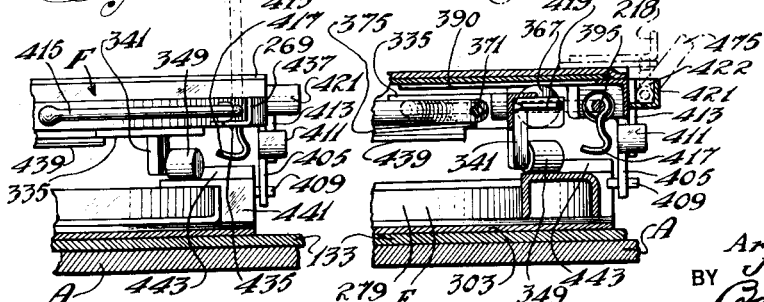

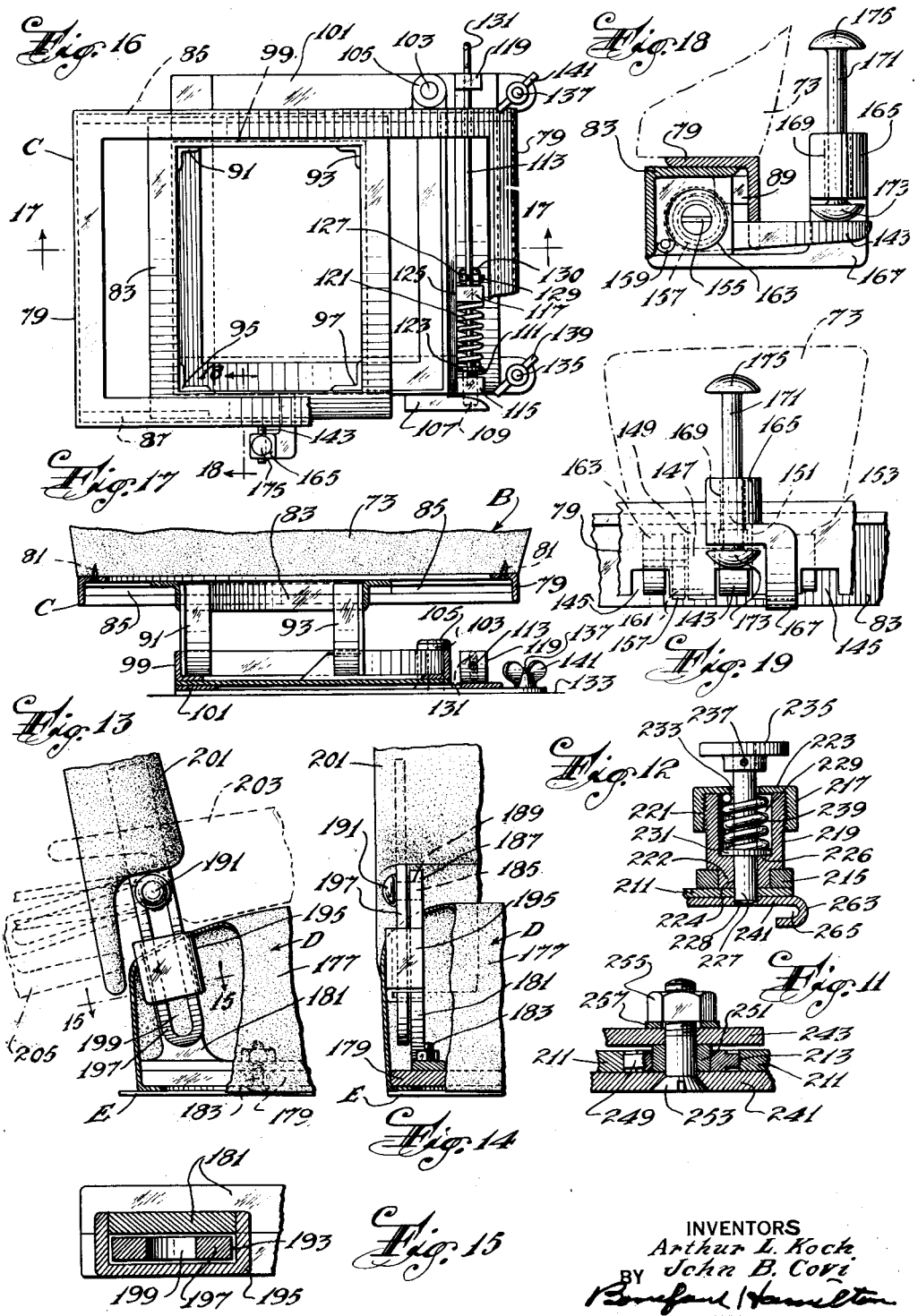

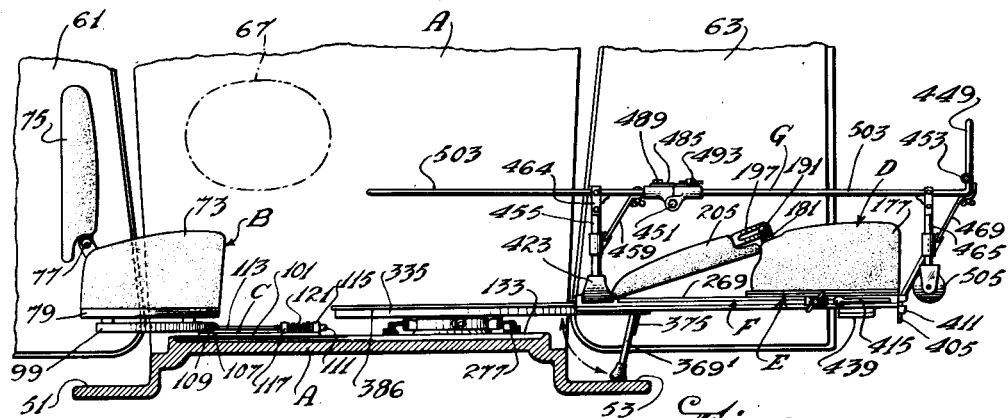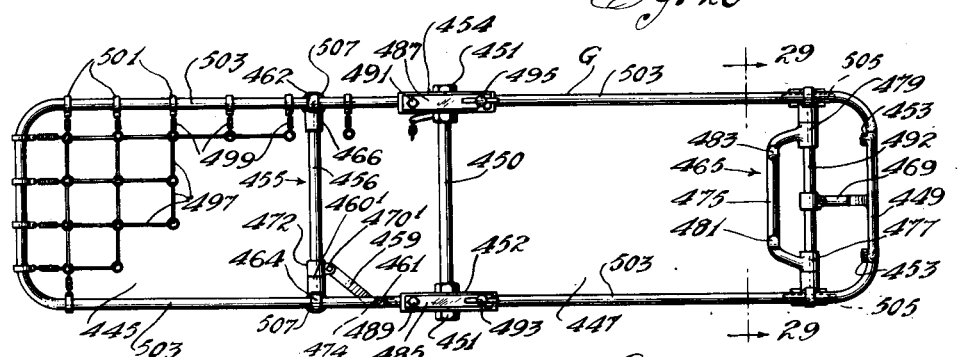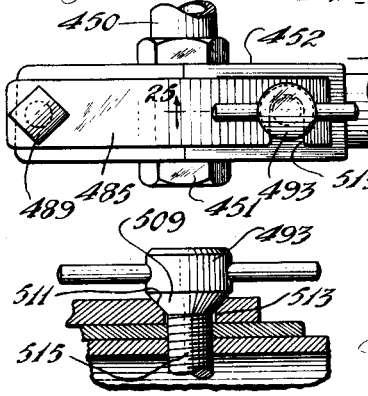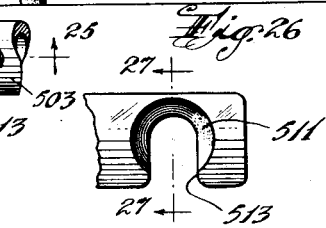

Patented Feb. 2, 1943

2,309,735

UNITED STATES PATENT OFFICE 2,309,735

VEHICLE CONSTRUCTION

Arthur L. Koch and John B. Covi, Elizabeth, N. J.

Application April 26, 1940, Serial No. 331,690

40 Claims. (Cl. 296—19)

It is becoming increasingly important in safety work to have available promptly facilities for aiding quickly the victims of highway accidents. Such facilities appropriately include transportation facilities for quickly transporting accident victims to the desired receiving station. Consequently it is becoming increasingly important for police highway patrols to be equipped with means whereby a passenger vehicle of usual construction may be converted quickly and easily into an ambulance conveyance for use in such emergencies without the usual delay incident to the arrival of the usual ambulance conveyance, which delay may be substantial, especially where an accident occurs at an isolated location.

Consequently, there have been various proposals for the provision of emergency vehicles. These include proposals where a stretcher or bed may be inserted into the vehicle from the rear end, or, where the vehicle is of the more usual types of vehicle construction, the support, such as a stretcher may be removed from the passenger compartment and inserted in the compartment, with its load by providing the car with a removable "center post."

The constructions heretofore proposed and provided have entailed substantial alterations in the body construction of the vehicles and in each case the removal of the stretcher and its replacement with its load is awkward and accomplishable only with difficulty.

In accordance with the present invention, there is provided a vehicle which is adapted for both passenger-carrying and emergency work, wherein means are provided for removing and inserting a stretcher or bed through utilizing the usual door openings without requiring the conventional body construction of a passenger car, whether it be of a two-door or a four-door type.

A further object of the invention is to provide novel stretcher mounting instrumentalities, whereby the stretcher mounting may be moved completely outside of the vehicle laterally thereof, through one of the usual door openings which will firmly support the stretcher while it is in completely extended position to receive its load, and which will continue to support the stretcher and its load while they are being moved back into the passenger compartment.

A still further object of the invention is to provide novel means for supporting a stretcher or bed to be moved by a single operator from its loading position to its carrying position.

A still further object of the invention is to provide improved adjusting means for the front seats of the vehicle whereby they may be adjusted easily to assure their being clear of the stretcher or bed during adjustment thereof.

A still further object of the invention is to provide an improved bed or stretcher construction for cooperating with the supporting means, whereby the bed or stretcher may be easily and firmly mounted on the said supporting means.

Further objects and advantages of the present improved construction will become apparent as the description proceeds, and the features of novelty will be pointed out in particularity in the appended claims; and the invention accordingly comprises the features of construction, combination of elements, and arrangement of parts, which will be exemplified in the construction hereinafter set forth and the scope of the application of which will be indicated in the claims.

The invention will be understood more readily by reference to the accompanying drawings, in which:

Fig. 1 is a sectional plan view of the interior of the passenger compartment of a conventional type of motor vehicle the view showing the seats and the relative position of the supporting mechanism of the present invention to the doors of the vehicle through one of which the loading and unloading is effected, the view being taken on the line 1—1 looking in the direction of the arrows.

Fig. 2 is a fragmentary side elevation of the passenger compartment, with the doors opened showing the relative position of the supporting mechanism to the floor of the compartment and to the seats, the view also indicating the position of the stretcher as mounted on the supporting instrumentalities.

Fig. 3 is a fragmentary sectional plan view of the passenger compartment the view showing the driver's seat being positioned to enable the supporting mechanism to be shifted between riding and loading positions.

Fig. 4 is a view similar to Fig. 3 but showing the direction of the movement of the supporting mechanism between riding and loading positions with the front seats adjusted to permit such movement.

Fig. 5 is a transverse sectional elevation showing certain details of construction of the supporting mechanism, the view being taken on the line 5—5 of Fig. 7 looking in the direction of the arrows.

Fig. 6 is a longitudinal sectional elevation showing additional details of the supporting mechanism, the view being taken on the line 6—6 of Fig. 7.

Fig. 7 is a fragmentary plan view of the rear parts of the supporting mechanism parts being broken away to show additional structural details.

Fig. 8 is a fragmentary plan view of the front portion of the supporting and carrying mechanism, parts being broken away.

Fig. 9 is a sectional elevation taken on the line 9—9 of Fig. 8, looking in the direction of the arrows.

Fig. 9A is a side elevation taken on the line 9A—9A of Fig. 8.

Fig. 10 is a plan view partly broken away of the supporting instrumentalities for the right-hand front seat.

Fig. 11 is a sectional elevation on the line 11—11 of Fig. 10, looking in the direction of the arrows.

Fig. 12 is a sectional elevation on the line 12—12 of Fig. 10, working in the direction of the arrows.

Fig. 13 is a fragmentary side view of a part of the supporting means and the lock and hinge joint for the back of the right-hand front seat.

Fig. 14 is a fragmentary front view of the mechanism of Fig. 13.

Fig. 15 is a sectional view on the line 15—15 of Fig. 13, looking in the direction of the arrows.

Fig. 16 is a plan view of the supporting frame for the operator seat.

Fig. 17 is a sectional elevation through the frame, showing a fragment of the operator's seat the view being taken on the line 17—17 of Fig. 16, looking in the direction of the arrows.

Fig. 18 is a sectional elevation on the line 18—18 of Fig. 17.

Fig. 19 is a side elevation of the lock mechanism for the front and rear adjustment for the driver's seat.

Fig. 20 is a plan view of a stretcher adapted to be used in connection with the improved supporting mechanism of the present invention.

Fig. 21 is a side elevation of the stretcher of Fig. 20.

Fig. 22 is a sectional elevation taken on the line 22—22 of Fig. 8.

Fig. 23 is a sectional elevation showing the stretcher mounted on the supporting means, and showing its position relative to the front right-hand front seat, the seat having its hinged back lowered to clear the stretcher with the supporting platform extended into loading position.

Fig. 24 is an enlarged plan view of the link employed for stiffening the stretcher.

Fig. 25 is a sectional view along the line 25—25 of Fig. 24.

Fig. 26 is a plan view of the lock end of the stretcher stiffening link.

Fig. 27 is a sectional view along the line 27—27 of Fig. 26.

Fig. 28 is a sectional side elevation showing on a somewhat larger scale, details of the supporting instrumentalities and indicating the adjustability of the right-hand front seat.

Fig. 29 is a sectional elevation through the stretcher frame, taken on the line 29—29 of Fig. 20 or 21, illustrating the means for interlocking the front end of the stretcher frame with the supporting instrumentalities.

While the present improved construction is illustrated herein and described as being incorporated in a motor vehicle such being the principal adaptation, it will be understood that insofar as concerns the stretcher supporting and mounting instrumentalities these may be applied to any type of conveyance or type of transport that may be utilized to transport passengers and wherein utilization of space is an important consideration; and of course the stretcher construction remains the same wherever the supporting instrumentalities are installed. It will be apparent, however, that an important utilization of the invention resides in the application to highway patrols, and fire-department safety equipment, wherein emergencies arise very frequently and where it often is difficult to obtain ambulance facilities with consequent possible dangerous results to the life of the injured individual, the invention, however, being useful in any condition where helpless individuals may be likely to require ambulance assistance for transportation to a station of aid.

Referring now more particularly to the drawings, the illustrative embodiment of the invention is shown as being installed in a conventional type of four-door sedan body, which is indicated generally at A, which has the usual running boards 51, 53, the usual rear seat cushion 55 and the rear seat cushion 57. The doors 61, 63 and 59, 65 are hinged in the usual manner the rear door hinges being indicated at 62, 62, and the front door hinges being shown at 64, 64, the doors when closed latching in the usual center-posts 66, 66. The front door openings are indicated at 59' and 59" and the rear door openings are indicated as 61' and 61". The usual front seat has been replaced in accordance with the present invention by a driver's seat assembly B, mounted on a seat support assembly C.

The right front seat assembly is indicated at D, which is mounted on a seat support assembly E, the seat support assembly E being supported on a handling mechanism F.

The details of these assemblies and handling mechanism will be set forth hereinafter in particularity.

In Figs. 1, 2 and 3 there is indicated a stretcher assembly, designated generally at G, the stretcher assembly being indicated in its extended position to show its relation to the body A and to the seats when the stretcher is mounted in riding position the stretcher assembly G being adapted to be moved through the right-hand front door opening 59'.

The usual steering wheel is indicated at 67, with the clutch pedal shown at 69 and the brake pedal at 71. These elements are in their usual position.

The driver's seat assembly B comprises a seat cushion 73, a back cushion 75, and the back cushion hinge 77 that holds the back cushion 75 in its proper relation to the seat cushion 73, while allowing the back cushion 75 to fold forwardly on the seat cushion 73. The seat cushion 73 is mounted on a frame 79 by means of screws 81. The frame 79 is slidably mounted on an adjacent lower frame 83, it being held in sliding position by slide strips 85, 87, and 89 which are attached to the frame 79. These details are shown in Figs. 16, 17 and 18.

It will be seen from Figs. 16 and 17 that the driver's seat assembly B, and frame 79 are mounted on the frame 83 which is part of frame 99, which in turn rests on frame 101, which is attached to the floor 133 of the vehicle.

The frame part 83 is secured to frame 99 by means of angle supports 91, 93, 95, 97 which are attached in any suitable manner to both the frames 83 and 99, and rigidly support the frame 83 over the frame 99, thereby enabling the frame 79 to slide freely on the frame 83.

It is necessary to bring the seat assembly B out of the way of the path of travel of the stretcher. In order to enable the driver's seat to be turned the frame 99 is pivoted on a pivot 103 which is anchored suitably to the frame 101 a collar 105 on the pivot 103 cooperating with a boss 106 on frame 99 to hold the frame 99 on the pivot.

Since the seat assembly B is pivotally mounted as has been just described releasable means are provided for normally holding the seat assembly in driving position. For this purpose the frame 101 is provided with upstanding lugs 115, 117, 119, which are attached to the frame 101, and which are provided with aligned holes to allow the passage therethrough of rod 113.

A lug 107 is secured to the frame 99 and extends horizontally therefrom, this lug having a hole 109 therethrough, which hole is in alignment with the holes in the vertical lugs 115, 117, 119, the hole 109 receiving a pin 111 which is the enlarged end of the rod 113, the end 123 of the pin 111 forming one abutment for a compression spring 121, which is slipped over the rod 113 and is compressed between the end 123 of the pin 111 and the surface 125 of the vertical lug 117.

On the rod 113 there is mounted a bolt 127, the said bolt being slidable along rod 113, and being provided with a nut 129 threaded thereon, compression of the spring 121 being effected by exerting a pull on the rod 113 and moving the bolt 127 along the rod while the latter is held in desired position until the bolt 127 engages the face of the lug 117, whereupon tightening of the nut 129 on the rod 113 prevents retraction of the rod and maintains the spring 121 in desired partial compression to maintain the pin 111 in extended position and in hole 109.

A ring 131 is formed on the other end of the rod 113 as a handle to enable pulling of the rod 113 for releasing pin 111 from hole 109, thereby freeing the frame 99 for allowing the frame to pivot on the pivot stud 103. As will be seen from Fig. 16, the frame 101 is secured to the floor 133 of the vehicle by means of studs 135, 137 and wing nuts 139 and 141. The sliding frame 79 is latched in various positions, to the frame 83 by a trigger 143 engaging a series of slots 145 (Fig. 19) in the frame 79.

This trigger 143 is rigidly attached to a pin 147, the latter being supported by lugs 149, 151, which are formed on the frame 83. The pin 147 has a head 153 on one end, the other end of the pin 147 being slotted, as indicated at 155, to receive the flat spiral spring 157, the opposite end of the spring 157 being held in position by loop 159 engaging a pin 161 anchored in lug 149, a collar 163 being provided on pin 147 to prevent the spring 157 from slipping out of position.

Since the trigger 143 is releasable from any given slot in order to permit the frame 79 to slide on the frame 83, means must be provided to effect such release. Thus, it will be seen that a lug 165 is supported over the trigger 143, the lug 165 being a part of a bracket 167 which in turn is attached to the lug 151. The lug 165 has a hole 169 therethrough, which hole receives a trigger-actuating pin 171, this pin having enlarged heads 173 and 175 at its ends, the head 173 resting on the trigger 143, so that when pressure is applied on the head 175, the trigger 143 is pushed out of locking engagement with the series of slots 145, thereby permitting the frame 79 to slide on the frame 83 to any desired position as controlled by slot 145.

Figs. 13 and 14 illustrate certain of the details of construction of right-hand front seat assembly D. This seat assembly comprises a seat cushion 177 mounted on a base 179. The base 179 has secured to it a bracket 181, bolts 183 securing the bracket 181 to the base 179. The bracket 181 has its upper end 187 provided with a stud 185, which is anchored to the bracket-end 187 in a hole 789, and which is provided with a large retaining head 191 for holding the extension of the back-supporting iron 197 and stud 185 extending through a slot 199 provided in the iron 197, the head 191 of the stud engaging the back surface of the supporting iron 197. A socket member 195 which is attached to the bracket 181 receives the extension 197 and holds the seat back 201 in upright riding position for a passenger sitting on the seat. However, when the back 201, is raised the extension 197 is lifted out of the socket 193, the seat back 201 thereby being released to swing into either a forward position 203 or a rear position 205, this being necessary in order to clear the stretcher during unloading and loading thereof.

The seat assembly D is mounted for rotation, as will be described in detail hereinafter, the forward position 203 of the seat back 201 being used when the seat is rotated the position 205 being used when the stretcher G is put into position, or for any other purpose that would require the seat-back 201 to be put out of the way.

In order further to enable the seat assembly D to be moved out of the path of movement of the stretcher, the seat assembly D is mounted on a turn-table D, by means of wood screw passing through holes 209 in the top plate 211 of the turntable. The plate 211 is provided with a central hole 213, a lug 215 extension assembly 217 which includes an upstanding outwardly flaring housing 219, and a group member 218. The lug 215 is suitably attached to the plate 211 and is provided with a central hole 221 which receives the stem portion 222 of the housing 219, the stem 222 being suitably secured to the lug 215.

The housing 219 has an opening extending longitudinally through it, the lower part 224 of which is smaller diameter than the upper recess 229, thereby defining an annular shoulder 226 which forms a seat for the collar 231 on pin 227 which snugly fits in the opening 224 in the housing portion 222. The upper part of the housing 229 is threaded externally as is indicated at 221 to receive a cap-nut 223 which has a hole 233 therethrough through which hole passes the pin 227. The upper recess 229 defines an annular space about the pin 227 for receiving a compression spring 239 which is compressed between the collar 231 and the underside of the cap nut 223, normally urging the pin 227 into hole 228 in the plate 241 upon which rests the plate 211. A head 235 which is attached to the pin 227 by a fastening pin 237, acts as a handle for lifting the pin 227 out of engagement with hole 228 to free the plate 211.

It has been mentioned above that the plate 211 rests on plate 241. Plate 211 is rotatably secured to plate 241 by a plate 243 which overlies the circular opening 213 in the plate 211. This mounting is shown in detail in Fig. 11 and will be referred to in detail hereinafter.

Secured in plate 241 are a plurality of rollers, indicated on Fig. 10 at 245, 247 and 249, which rotate on collars 251 mounted on bolts 253, the periphery of the rollers engaging the wall 212 which defines the perimeter of the circular opening 213.

The details of the mounting of the plate 243 and of the rollers 245, 247 and 249 are shown in Fig. 11, which typifies the mounting of all of the rollers. It will be seen that the plate 241 is perforated to receive the bolts 253 the collars 251 fitting over the bolts 253 and separate the plates 241 and 243 to permit a sliding clearance for the plate 211. Nuts 255 and lock washer 257 complete the assembly.

The plate 241 is provided with an extension 259, which extension serves as locking means for the stretcher as will be described hereinafter. Grooves 261 are positioned as shown at the edges of the plate 241 these grooves functioning to raise the pin 227 as the plate 211 rotates on plate 241. This action will be understood when it is noted that pulling the pin 227 out of the hole 228 releases the plate 211 for rotation the end of the pin riding on the surface of the plate 241. However, the position of the pin at the corner of the plate 211 is such that as plate 211 rotates the pin 227 is moved off from the plate 241, the pressure of spring 239 immediately snapping the pin 227 in extended position, which is just below the plane of the top of plate 241 as is shown in Fig. 12; now the grooves 261 slope upwardly away from the edges of plate 241, so that as the pin 227 engages the slope of the grooves 261, it is lifted until it comes into engagement again with the top of the plate 241 incident to continued rotation of the plate 211. When the rotation of the seat D is completed so that the seat is in reversed position the pin 227 enters the hole 230 in plate 241, which hole is diametrically opposite to the hole 228, to lock the seat in reversed position. Grooves 261 therefore perform the function of lifting cams, and are provided on each side of the plate 241 except that beneath the side 263 of plate 211, which side is already bent over, as will be explained hereinafter.

One side 263 of the plate 241 is turned over as is indicated at 265 (Fig. 12) to hook over the slide 267 on the top platform 379 of the handling mechanism F. The opposite side of plate 241 rests on the slide 269 on the top platform 379. Lug 271, mounted on plate 241 receives a set screw 273 having wing nut 275 thereon, complete the clamping means for releasably clamping the seat support E to handling mechanism F for securing the seat support in desired adjustment relative to the handling mechanism, the lug 271 extending over the slide 269, retaining the seat support in position on the handling mechanism.

The details of this handling mechanism F is shown in plan view Figs. 7 and 8, and in section in Figs. 5, 6, 9, 9A and 22.

The handling mechanism F includes a lower frame 277 which defines longitudinal tracks 279, 281 secured to the floor for rollers 283, 285, 287, which are mounted on yoke 289 which yoke consequently forms a carriage for the upper portion of the handling mechanism which extends and retracts along the tracks 279 and 281.

This yoke 289 also carries guide rollers indicated at 291, 293, 295 and 297, which are mounted on brackets 292 and 294 extending from the annular rim 296 of the yoke 289, the brackets 292 and 294 being recessed at the ends thereof for receiving these rollers, the rollers 291 and 293 rolling against edge 299 and of the frame 277 and the rollers 295 and 297 roll against the edge 301 of this frame. A sheet metal guard 303 is placed under the frame 277, the guard plate 303 being secured to the frame 277 by screws 305, the frame 277 being secured to the floor 133 of the body A by means of screws 307.

Mounted in the annular rim 296 of the yoke 289 and extending outwardly therefrom are a plurality of studs indicated at 309, 311, and 313, on which studs are mounted, respectively, the rollers 315, 317, 319, which rollers support a pan 321 and move on the flat bottom of the inverted pan 323 which forms a plate the pan 321 and plate 323 being maintained in their proper position by bolts 325, cooperating with spacers 327 and nuts 329.

A plurality of rollers 321 rotate on the spacers and bear against the inner surface 333 of the annular ring 296 of the yoke 289, thereby causing the pan 321 and plate 323 to rotate about a central axis.

A frame 335 is mounted on the pan 321 to which frame are secured lugs 337, 339, 341, and 343 (see Figs. 7 and 8), there being one of these lugs at each corner of the frame, these lugs supporting suitable studs on which are mounted rotatably rollers 345, 347, 349, and 351. The rollers 345 and 347 roll over the rear 353 surface of the frame 277, and the rollers 349 and 351 roll over the front surface 355 of the frame 277.

The frame 335 carries two forward rollers 357 and 359, which rollers are mounted on pins 361 and 363 supported in yokes 365 and 367, suitably attached to frame 335, and a cover plate 337 is secured to frame 335 to protect the pan 321.

A supporting leg assembly 369 including supporting legs 370 and 372, joined by rod 374, is pivotally mounted on the frame 335 on bolts 371 and 373, a lift plate 375 being secured to the leg 372 which plate forms the abutting surface for the lifting instrumentalities 439, which are attached to frame 379, and which will be referred to in greater detail hereinafter.

This frame 379 is the top platform frame and it is slidably mounted on the frame 335 by means of rollers 385 and 387, which bear against the underside of the outwardly extended flanges 386 and 388 of the frame 335. These rollers 385 and 387 are mounted on suitable studs secured to the frame 379. Also secured to the frame 379 are the rollers 381 and 383, which engage the upper surface of the flanges 386 and 388, being positioned substantially directly above the rollers 385 and 387, these latter rollers taking the weight of the rear end of platform 379 when this platform is extended, the front rollers 357 and 359 which engage the undersurface of flanges 390 and 392 of the frame 379 support the front end of platform 379 when the platform 379 is extended. The rollers 385 and 387 therefore prevent the frame 379 from raising above the frame 335 when the frame 379 is in its extended position and when the frame 379 carries a load, the frame 379 being prevented from lifting off of frame 335 by lock studs 389 and 391 which also provide stop points for controlling the forward position of the frame 379 by engagement with yokes 365 and 367 on frame 335.

The platform 379 is held normally closed by means of a locking cam 393, which is mounted on a shaft 395, this shaft 395 being mounted in lugs 397, 399 and 401 on frame 379. A lift finger 403 rides on cam 393, the finger 403 being a part of a locking bar 405, the bar 405 having a slot 407 therein adjacent to its lower end, which slot 407 engages a pin 409 mounted in the lower frame 277. The locking bar 405 is held in position by a yoke 411 thereon, which yoke 411 receives a guide bar 413, mounted on platform 379, the yoke 411 sliding relative to the bar 413 responsively to movement of locking bar 405. The slot 407 is of a length such that when the cam 393 is brought into lifting position the bottom of slot 407 tightly clamps against the pin 409, and also clamps the rollers 349, 351, against the top surface 355 of frame 277.

The cam 393 is actuated by turning shaft 395 by means of handle member 415 on the shaft 395. The shaft 395 carries a hook member 417, which is rigidly secured to the shaft, and which is in inoperative position when the cam is in locking poistion as shown in Fig. 8. When shaft 395 is turned to release the cam 393, the hook 417 is brought into engagement with an eye member 419 on frame 335, thereby interconnecting frames 379 and 335, and enabling these frames to be extended together to the intermediate position indicated at 420 in Fig. 4; then by returning the cam 393 to a position corresponding to its locking position, the hook 417 disengages the eye member 419, thereby allowing the platform 379 to be extended to its full position, as shown in Fig. 4. As the platform 379 reaches its full position the supporting assembly 369 drops into carrying position on the running board 53 of the vehicle. In order to prevent shaft 395 from turning too far, a pin 433 is provided in the shaft, which pin acts as a stop pin when it engages stop 435 on frame 379 for the locked position and stop 437 on platform frame 379 for the unlocked position.

The frame 379 is provided with brackets 423 and 425 for supporting the rear legs of the stretcher, these brackets having their upper surfaces carpeted, as indicated of 430 and 432, respectively, and a cover plate 427 for the platform is secured to the platform, the platform being covered with a strip of carpet 429; and a crow bar 431 forms a rear stiffener for frame 379.

Also the platform frame 379 is provided with a lifting bracket 439 secured to the frame, which lifts the supporting assembly 369 by engagement with the abutment plate 375 as the platform 379 is moved to retracted position.

The end of bottom frame 277 is formed in a radius, as indicated at 441 in order to clear the lock bar 405 when the platform assembly is turned in order to allow for unobstructed turning of the platform assembly.

Additionally, a stop 443 is provided on the surface 355 of the frame 277, against which stop the roller 349 abuts for guiding the frame 335 back into its retracted position.

Passing now to the consideration of one form of a stretcher, or bed, which may be utilized in connection with the above-described seat-adjusting instrumentalities, and which is shown in detail in Figs. 20, 21, and 23, it will be seen that the stretcher comprises a frame defining a head section 445, a foot section 447 and a foot-rest 449, the head section and the foot section being foldable one on the other by means of a hinge 451, 451, and a second hinge 453 allows the foot seat 449 to fold on to the foot section 447. The hinges 451, 451 are located at the ends of a bar 450 which extends transversely of the stretcher frame in a plane somewhat below the plane of the frame, the bar 450 being held in hinge brackets 452 and 454, the stretcher frame being held rigidly in extended positon by links 485, 487, which are pivoted on bolts 489, and 491 to release the sections of the stretcher for folding the same together, the links 485 and 487 being held in securing position by screws 493 and 495.

The rear end of the stretcher is supported by a rear leg assembly 455 which includes legs 456 and 458 which are hingedly mounted in brackets 464 and 466 and which are joined by bar 456. The brackets 464 and 466 extend over the stretcher frame and may be secured thereto by any appropriate means, such as by rivets or the like, one of which is shown at 468.

The leg assembly 455 is pivoted on corresponding brackets secured to the stretcher legs 456, 458 one of which brackets is indicated at 470, there being one of such brackets on either side of the stretcher frame, there being corresponding pivot points for each leg 456 and 458, thereby enabling the leg assembly to be folded when the stretcher is not in use. However, when the stretcher is in use, the leg assembly 455 is held rigid by a brace 459 which is pivotally secured at 470' to a bracket 472 positioned on bar 456 of the leg assembly, the brace being adapted to be secured removably to the stretcher frame by means of a bolt 461 and nut 463 cooperating therewith, the bracket 472 being mounted between a stop 460 and a shoulder 460' on bar 456 and rotates on bar 456 when the slot 474 in the brace 459 straddles the extending end of the bolt 461. The brace 459 is secured by tightening nut 463.

A foot 507 is provided for each leg of the leg assembly 455 these being received normally in the brackets 423 and 425 in the handling frame, when the stretcher is mounted thereon.

The foot end of the stretcher is supported by a front leg assembly 465, which includes legs 478, 480, which are pivoted at 467, 482, in straps 484, 486, which are passed over the side bars of the stretcher frame and secured in position by bolts 488, 490.

The legs 478 and 480, are joined by a bar 492, a brace 475 being attached rigidly to the bar 492 at 477, 479, the brace 475 being provided with guide lugs 481 and 483, these lugs controlling the position of the stretcher in the bracket 421 when the lugs 481 and 483 engage extension 259 on seat support 241.

The leg assembly 465, being hinged as described above, may be folded when the stretcher is not in use, but the assembly is held in rigid position by a brace 469 which is held in an adjustable bracket 494 and which is releasably secured to the stretcher frame by a bolt 471 and nut 473.

Casters 505, 505 are provided for the legs 478, 480.

The stretcher is provided with a wire center 497, which is held in position by springs 499, the springs being held in straps 501 on the side rails 503, 503, of the stretcher frame.

Figs. 24 to 27 inclusive show details of the links 485 and 487. From these views, it will be seen that the bolts 493, 495 have a tapered shoulder 509 that presses against the tapered surface 511 of slot 513. Slot 513 clears the threaded portion 515 of bolt 493.

The brackets 423 and 425 are provided with locking slots 422 and 424 which are cut into the housings 426 and 428 of brackets 423 and 425, for preventing accidental slipping of the stretcher legs received therein.

The operation of the above-described mechanism is as follows:

In the normal riding arrangement for passengers, the seats are arranged in normal manner, as is shown in Figs. 1 and 2, for example, wherein B designated the driver's seat, D, being the adjacent front seat. Also the rear seat cushion 55 and the rear seat back cushion 57 are arranged in the usual way for the riding accommodations of passengers.

The seat B is mounted on the seat support C, this latter being fastened to the floor of the sedan body A by wing nuts 139 and 141 on studs 135 and 137.

When it is desired to change the seating arrangements to enable the stretcher to be carried in riding position the operator presses down on the head 175 of pin 171 to disengage the trigger 143 from the slot 145, and while sitting in the seat, the operator causes the seat B to move forward, this clearing the door opening 61'. In order to swing the seat about pivot 103, a pull is exerted on ring 131 to disengage the pin 111 from hole 109, by pulling on seat B and when the pin 111 is out of the hole 109, the seat B can be swung on pivot 103 and moved out through the door opening 59''.

The door 63 next is opened, and the handle 415, which is shown in locked position in Figs. 1, 3 and 9A, is shifted to the dotted line position 415' in Fig. 9. This action releases the slot 407 on pin 409, and engages the hook 417 in eye 419, and then when the handle 415 is pulled through a forward and outward motion, the frames 379 and 335 are shifted into the position 420 shown in Fig. 4, and then upon dropping the handle 415 into the position shown in Fig. 4, the hook 417 is released from the eye 419. Then by pulling on frame 379, it rides out on rollers 383, 385, 381, 387, 359 and 357 to a position shown in Fig. 4 or to a position where stop screws 389 and 391 engage the ends of blocks 367 and 365.

When the frame 379 is pulled forward, the lifting bracket 439 slides out from under the lift plate 375, and permits the leg assembly 369 to fall to position 369' by pivoting about the bolts 371 and 373, the rubber ends of supporting legs 370 and 372 of the leg assembly 369 rest on the running boards 53, the backward swinging motion being controlled by the end of the plate 375 striking against the stop 374.

The seat assembly D, which is mounted on the support E is moved to the rear by loosening screw 273 by turning the wing nut 275 and pushing the assembly back on angles 267 and 269, thereby causing extension 259 on plate 241 to uncover the top opening of the bracket 421. The seat back 201 of the seat assembly D is lifted out of its sockets and is laid back. Thus the handling mechanism now is ready to receive the stretcher.

The folded stretcher G is arranged as shown in Figs. 20 and 21 by opening up sections 445 and 447 about hinge 451 extending leg assembly 455, and clamping the leg assembly 455 in rigid position by slipping the brace 459 over the bolt 461 and tightening up on the wing nut 463. The leg assembly 465 is extended by slipping the brace 469 over the bolt 471 and tightening up on wing nut 473.

The stiffening link 485 is swung about the bolt 489 until the slot 513 straddles bolt 493, which bolt then is screwed into position, thereby causing the tapered surface 509 on the bolt 493 to become engaged with the tapered surface 511 of the slot 513 in link 485.

The stretcher assembly G in its extended position then is placed on frame 379 by resting the rubber stops 507 on the carpeted surfaces, 430 and 432 of brackets 423 and 425, and by inserting the brace 475 in the space 422, formed by the extension 421, as is indicated in Fig. 9, for example.

The seat support E then is moved forward until the extension 259 of the plate 241 passes through the slots in the lugs 481 and 483 on the brace 475. The screw 273 then is clamped in position by turning wing nut 275, thereby clamping the seat support E on the frame 379.

The rear end of stretcher G is kept from lifting up by the collars on shoulders 460 and 462 on the leg assembly 455 coming in contact with the extension 426 of bracket 423 and the extension 428 of bracket 425. The slots 422 and 424 straddle the legs of the assembly 455 and prevent any appreciable side movement.

The stretcher G now is held to platform 379 of the handling mechanism F and is in the extended position G' as shown in Fig. 4.

The stretcher then is pushed back into its riding position by rolling the frame 379 back onto frame 355, and when this is done, the lifting bracket 439 engages lift plate 375 and raises the legs.

When this has been done the stretcher will be in the approximate position indicated by G'' in Fig. 4. This position clears the steering wheel 67. Now by combining the pushing action on the stretcher to the inside of the passenger compartment and then towards the rear of the compartment enclosure with the resultant motion produced by the combination of rollers 331 on the surface 333 of yoke 289, rollers 315, 317, and 319 on the pan 321 and plate 323 rollers 283 and 285 in the track 279, roller 287 in track 281, rollers 291 and 293 acting against the edge 301 of the frame 277, and then by the action of roller 345 on the front surface 355 of the frame 277, and roller 349 on the rear surface 353 of this frame 277, roller 347 also on this rear surface 353, whereby roller 349 is guided by the stop 443 and roller 351 contacts the front surface 355 of the frame 277 until the guide 443 pushes roller 349 back into position to cause the yoke 289 to contact stop screw 290, and until the slot 407 straddles the lock pin 409. The handle 415 is in the vertical position 415' during the loading operation, and when the top frames 379 and 335 are in the riding position the handle 415 is shifted to the horizontal position shown in Fig. 9, thereby causing the assembly to be locked in riding position.

The driver's seat B then is pushed back in position and lug 107 pushes the pin 111 back until the pin 111 is opposite hole 109, when the spring 121 pushes the pin 111 into the hole 109, thus locking the seat in the riding position.

The seat assembly D when mounted on seat support E is arranged to be positioned in any station in the circle. This is done by lifting the handle 235, thereby lifting the pin 227 out of the hole 228, and then the seat can be turned because the surface 212 of the hole 213 contacts the surface of the rollers 247, 247 and 249, and plate 211 slides on plate 241, when the pin 227 snaps into hole 230, so that the position of the seat assembly D may be changed 180° from the position indicated on the drawings. Of course, additional holes may be provided in the plate 241 if other positions of the seat are required. The paths of movement of the parts are indicated by dotted lines on Fig. 4.

It will be understood of course that the invention is not to be limited to the precise embodiments and details that have been illustrated, but that various modifications and changes may be made without departing from the invention. Thus it is contemplated to remove the seat assembly D completely from the seat support E, and to be able to push the seat assembly D back towards the rear seat cushion 55 to provide a seat arranged to carry those who cannot bend their leg or legs. Accordingly, it will be understood that it is intended to be included within the scope of this invention such modifications and changes as may be necessary to adapt it to varying conditions and uses.

What is claimed is:

1. In a vehicle, the combination of a vehicle body having a side opening, a rectangular platform longitudinally disposed within the said body and supported on the floor thereof for bodily movement parallel to the said floor, means for shifting the platform between a riding and an extended position, the said means enabling the platform to be moved between longitudinal position entirely within the body and a position transverse of the body, instrumentalities for extending the entire platform outwardly through the side opening when the platform is in transverse position until the entire platform projects beyond the body to a substantial distance, the said instrumentalities including mounting means enabling the entire platform to be extended completely beyond the vehicle body, and means in the vehicle body for anchoring the platform interiorly of the body when the platform is in extended position.

2. In a vehicle, the combination of a vehicle body having a side opening, a platform assembly longitudinally disposed within the said body at one side of the longitudinal axis of the body and supported on the floor thereof for bodily movement parallel to the said floor, and means for shifting the platform assembly between a riding position in the body and extended position through the said side opening in a multiplicity of selected paths of movement enabling the platform to avoid engagement with normally obstructing elements in the vehicle body, as the platform is moved through the said side opening into its extended position.

3. In a vehicle, the combination of a vehicle body having a side opening, a rectangular platform assembly longitudinally disposed within the said body and supported on the floor thereof for bodily movement parallel to the floor, means for shifting the platform assembly between riding and extended position, the said means including instrumentalities for causing one end of the platform assembly to travel in a longitudinal path within the body and the opposite end of the assembly to travel in a path transversely of the body and to be projected outwardly through the side opening substantially beyond the body of the vehicle, the said instrumentalities including mounting means enabling the entire platform to be extended completely beyond the vehicle body, anchoring means within the said body for anchoring the interior end of the said platform assembly when the assembly is in extended position, means on the said platform for mounting a stretcher on the platform, and locking devices for releasably securing the stretcher to the platform, the said platform assembly being removable completely from the body of the vehicle.

4. In a vehicle, the combination of a vehicle body having a side opening and a floor, parallel track members secured to the floor and extending longitudinally of the body within the said body, a platform assembly longitudinally disposed within the said body and slidably mounted on the said track members for horizontal bodily movement within the said vehicle body, a seat assembly mounted on the said platform assembly, the seat assembly including a seat, a mounting plate for the seat, and carrying a member slidably mounted on the said platform and supporting the said seat-mounting plate, means for turning the said platform assembly laterally through the side opening to a position intermediate riding and seat-extended position, means for moving the seat-mounting plate and the seat on the platform assembly to fully extended position, the said turning means defining anchoring instrumentalities for the said platform assembly within the body, means exterior of the body for supporting the platform assembly externally of the vehicle, and collapsible supporting means for the seat-mounting plate becoming operative exteriorly of the body when the seat assembly is in extended position.

5. In a vehicle, the combination of a vehicle body having a side opening and a floor, parallel track members secured to the floor and extending longitudinally of the body interiorly thereof, a platform assembly longitudinally disposed within the said body and slidably mounted on the said track member for movement within the said vehicle body, means for moving the said platform assembly along the track member to a station enabling it to be turned to extend through the said side opening, a turntable for enabling the said platform assembly to be turned through the said side opening and extended beyond the body, a seat assembly mounted on the said platform assembly, the seat assembly including a seat, a mounting plate for the seat, means for slidably securing the mounting plate to the platform assembly, for sliding the seat mounting plate and the seat to fully extended position, the said turntable defining anchoring means within the body for the said platform assembly and seat assembly, and means on the seat and platform for receiving and mounting a stretcher placed thereon.

6. In a vehicle, the combination of a vehicle body having a side opening and a floor, track members secured to the floor and extending longitudinally of the body interiorly thereof, a platform assembly longitudinally disposed within the said body and slidably mounted on the said track members for movement within the said vehicle body, means for moving the said platform assembly along the track member to a station enabling the said assembly to be turned to extend through the said side opening, a turntable for enabling the platform assembly to be turned through the said side opening, and a top platform mounted on the platform assembly, and supporting means for enabling the platform to be extended and retracted relative to the platform assembly the said turntable defining anchoring means within the said body for the said platform assembly.

7. In a vehicle, the combination of a vehicle body having a side opening and a floor, parallel track members secured to the floor and extending longitudinally of the body interiorly thereof, individual seats movably mounted in the body, a platform assembly disposed within the said body and slidably mounted on the said track members for movement within the said body, means for moving the said platform assembly along the track members to a station enabling it to be turned to extend through the said side opening, a turntable for enabling the said platform assembly to be turned through the said side opening and extended beyond the body, a seat assembly mounted on the said platform, the seat assembly including a seat, a mounting plate for the seat, means for slidably securing the mounting plate to the platform for sliding the seat mounting plate and the seat to fully extended positions, the said turntable defining anchoring means within the body for the said platform and seat assembly, means exterior of the body for supporting the extended platform outside of the body for the mounting plate and seat, means on the seat and platform for receiving and mounting a stretcher placed thereon, and instrumentalities for rendering the seats unimpeding to the mounting of the stretcher and movement thereof between loading and riding position.

8. In a vehicle, the combination of a vehicle body having a side opening and a floor parallel track members secured to the floor and extending longitudinally of the body interiorly thereof, individual seats movably mounted in the body, turntable mechanism mounted on the track members and movable therealong, a platform normally disposed within the body mounting means turnably mounting the said platform on the turntable for enabling the said platform to be turned through the said side opening when the turntable is moved along the said track member to a position suitable therefor, mechanism enabling the said platform to be extended relative to the said mounting means, and a seat assembly slidably mounted on the platform and adapted to be extended relatively thereto entirely beyond the vehicle body, the said turntable providing anchoring means inside of the said body for the platform and seat assembly.

9. In a vehicle, the combination of a vehicle body having a side opening and a floor, parallel track members secured to the floor and extending longitudinally of the body interiorly thereof, a seat mounted forwardly in the body, means for mounting the said seat on the track members for enabling the seat to be moved longitudinally within the body to a predetermined position along the track members including a station adjacent to the side opening, means for turning the seat transversely of the body, means for extending the seat through the side opening to a position outside of the body, and mechanism enabling the said seat to be turned on its mounting through a complete circle.

10. In a vehicle, the combination of a vehicle body defining a passenger compartment having conventional side openings and door closures therefor, front and rear seats in the said body, mounting means for one of the front seats enabling it to be rotated until the seat faces the rear seat, means for longitudinally adjusting the front seat in the said compartment into a position enabling a rider on the rear seat to support his legs in desired extended position, and mechanism associated with the mounting means for enabling the front seat to be extended laterally from the body through a side opening.

11. In a vehicle, the combination of a vehicle body having opposite side openings and a floor. parallel track members secured to the floor and extending horizontally of the body interiorly thereof, a pair of individual seats mounted forwardly in the body, means for mounting one of the said seats on the track members for enabling the seat to be moved longitudinally within the body to a predetermined position along the track members including a station adjacent to the side opening nearest to the said seat, means for turning the seat transversely of the body, means for extending the seat through the side opening to a position outside of the body, and instrumentalities for shifting the other seat of the said pair outwardly from the body through its side opening in order to enable the seat to clear movement of a stretcher mounted on the said seat extending means during shifting of the stretcher and seat extending means between loading and riding positions.

12. In a vehicle, the combination of a vehicle body having opposite side openings and a floor, parallel track members secured to the floor and extending horizontally of the body interiorly thereof, a pair of individual seats mounted forwardly in the body, means for mounting one of the said seats on the track members for enabling the seat to be moved longitudinally within the body to a predetermined position along the track members including a station adjacent to the side opening nearest to the said seat, means for turning the seat transversely of the body, means for extending the seat through the side opening to a position outside of the body, means for mounting a stretcher on the seat-extending means, locking devices for locking the mounted stretcher in position, means for dropping the back of the seat into a non-obstructing position relative to the stretcher, and instrumentalities for shifting the other seat of the said pair outwardly from the body through its side opening in order to enable the seat to clear movement of the stretcher during shifting thereof between loading and riding positions.

13. In a vehicle, the combination of a vehicle body having opposite side openings and a floor, a pair of individual seats mounted forwardly in the body, means for mounting one of the said seats in the body for longitudinal movement within the body to a predetermined position including a station adjacent to the side opening nearest to the said seat, means for turning the seat transversely of the body, and means for rendering the other seat unimpeding to a stretcher carried on the said mounting means for the longitudinally movable seat as the stretcher is moved between loading and riding positions.

14. In a vehicle, the combination of a vehicle body having a side opening and a floor, parallel track members secured to the floor and extending longitudinally to the body interiorly thereof, a seat assembly mounted forwardly in the body, means for mounting the said seat assembly on the track members for enabling the seat to be moved longitudinally within the body to a predetermined position along the track members including a position adjacent to the side opening, means for turning the seat transversely of the body, means for extending the seat through the side opening to a position outside of the body, and stretcher-mounting instrumentalities on the seat-extending means for mounting a stretcher thereon, the said instrumentalities including devices for supporting locating and locking the stretcher in position.

15. In a vehicle, the combination of a vehicle body having a side opening and a floor, parallel track members secured to the floor and extending longitudinally of the body interiorly thereof, a seat assembly mounted forwardly in the body, means, for mounting the said seat assembly so that it may be moved from riding position to a stretcher-mounting position, stretcher-mounting instrumentalities on the seat assembly and on the assembly-mounting means, the said instrumentalities including a front retaining member on the seat assembly and lateral holding devices on the assembly-mounting means, a stretcher mounted on the seat-assembly-mounting means, the said stretcher including sections hingedly-connected together, means for rigidly securing the sections in extended positions, a frame positioned in the front retaining member, supporting instrumentalities for supporting the rear end and sides of the stretcher and means, outside of the vehicle for supporting the seat assembly and assembly-mounting means when in stretcher-receiving position, the said supporting means for the seat assembly and assembly-mounting means being collapsible to enable the mounted stretcher to be moved between loading and riding positions.

16. A stretcher adapted to be mounted on a seat mounting means of a standard type passenger vehicle that is convertible from a passenger-carrying vehicle into an ambulance, which comprises a head section and a foot section, hinge connections between the sections enabling the stretcher to be folded completely together for storage in a standard baggage compartment when not in use without restriction of passenger-carrying space or accommodations, means for holding the sections rigid when in extended position, and front and rear supporting means for the stretcher adapted to engage with complementary receiving instrumentalities on the assembly mounting means for securing the stretcher in position for movement between mounting and riding positions.

17. A stretcher adapted to be mounted on seat-mounting means of a standard type passenger automobile that is convertible from a passenger-carrying vehicle into an ambulance, which comprises a head section and a foot section, hinge connections between the sections enabling the stretcher to be folded completely together for ample storage in a standard baggage compartment usually provided in the standard automobile without restriction of passenger-carrying space or accommodations when not in use, means for holding the sections rigid when in extended position, front and rear supporting means for the stretcher adapted to engage with complementary receiving instrumentalities on the seat-mounting means for securing the stretcher in position for movement between mounting and riding positions, the said front and rear supporting means being hingedly mounted on the stretcher for collapsing when the stretcher is folded, means for rigidly holding the supporting means in supporting position when the stretcher is in use, and collapsible means on the stretcher for facilitating movement of the stretcher to any desired loading position.

18. In a vehicle having an elongated compartment with opposite side openings in the forward portions of its side walls and a pair of seat members mounted forwardly therein, substantially parallel track members extending lengthwise in the compartment, an elongated table slidably mounted on the track members, the said table carrying one of the seat members of the said pair, means for mounting the seat member on the table, instrumentalities enabling the said table to be shifted to project an end thereof through its adjacent side opening, and mechanism for moving the seat member to a fully extended position for receiving a stretcher, means for positioning the seat unobstructedly relatively to the stretcher, and means for adjusting the other seat of the said pair in order to clear the movements of the table and stretcher between riding and loading positions.

19. In a passenger vehicle of the class described having the body formed to provide an entrance space on one side of the vehicle and a seat assembly including a seat mounted forwardly therein, track members in the body extending lengthwise thereof, the seat assembly being mounted on the said track for sliding therealong, means for extending the seat through the said space to a distance beyond the body for enabling an extended stretcher to be mounted on the said means, the stretcher being adapted to carry a human body thereon, anchoring devices within the vehicle body for the said means and extended seat, means outside of the vehicle body for supporting the extended seat, and stretcher-mounting instrumentalities on the said extending means for securing a mounted stretcher in position thereon for shifting between loading and riding positions.

20. In a passenger vehicle of the class described having the body formed to provide entrance spaces on both sides of the vehicle and a pair of seat assemblies mounted forwardly thereof, each of the said assemblies including a seat, track members in the body extending lengthwise thereof, one of the said seat assemblies being mounted on the said track for sliding along to a preselected position, means for turning the seat and its assembly to enable extension thereof through its side opening in the body, means included in the seat assembly for moving the seat from its position within the body to a position substantially beyond the body, means for supporting the seat in extended position, means for securing an extended stretcher on the said moving means, instrumentalities for releasably locking the stretcher in mounted position, releasable locking devices for maintaining the seat assembly in desired adjusted position, and means for moving the other seat assembly to a position unobstructing to the stretcher, during movement of the stretcher between loading and riding positions.

21. In a vehicle, the combination of a vehicle body having a side opening, a platform longitudinally disposed within the said body and supported on the floor thereof for movement in the said body, and turning means for the platform so that when the platform is moved its rear end is caused to move in an eccentrically arcuate path from a position within the body to a position outside of the body and its forward end to simultaneously travel in a path transverse of the body and to be projected outwardly through the side opening.

22. In a vehicle, the combination of a vehicle body having a side opening and a floor, track members secured to its floor and extending longitudinally of the body interiorly thereof, individual seats movably mounted in the body, a platform assembly disposed within the body and slidably mounted on the track members, means for moving the platform assembly along the track members to a station enabling the platform assembly to be turned to extend through the side opening, means for the platform assembly enabling it to be extended completely through the side opening to a station remote from the vehicle body, and instrumentalities for rendering the seats unimpeding to the mounting of a stretcher on the platform assembly and to the movement thereof between loading and riding positions.

23. In a device of the character described, the combination of track members adapted to be secured to the floor of a vehicle, a seat mounted on the track members, and mounting means for mounting the said seat on the track members for enabling the seat to be moved on the track members when installed in the vehicle the mounting means for the seat including turning instrumentalities for enabling the seat to be turned transversely of the track, and extensible mechanism anchored to the turning instrumentalities for enabling the seat to be extended to a position wholly exterior of the vehicle in which the device is to be mounted, while firmly supporting the seat in extended position.

24. In a device of the character described, the combination of seat-mounting means adapted to be secured to the floor of a vehicle and a seat mounted on the seat-mounting means, the said means including a turntable for enabling the seat to be turned transversely of the vehicle in which the seat is to be mounted, and extensible mechanism for enabling the seat to be extended to a position wholly exterior of the said vehicle in which the seat is to be mounted, while firmly supporting the seat in extended position.

25. In a device of the character described, the combination of seat-mounting means adapted to be secured to the floor of a vehicle, and a seat mounted on the seat-mounting means, the said means including turning instrumentalities for enabling the seat to be turned transversely of the vehicle in which the seat is to be mounted, and extensible mechanism for enabling the seat to be extended to a position wholly exterior of the vehicle in which the seat is to be mounted, and means for rigidly mounting a bed on the extensible mechanism, the said turning instrumentalities constituting anchoring means for the extensible mechanism for rigidly supporting the latter when in extended position together with the bed mounted thereon.

26. In a device of the character described, the combination of seat-mounting means adapted to be secured to the floor of a vehicle, a seat mounted on the seat-mounting means, the said seat being provided with a back, means on the seat-mounting means for mounting a bed thereon, and means for moving the seat-back to a station unimpeding to the said bed.

27. In a device of the character described, the combination of seat-mounting means adapted to be secured adjustably to the floor of the vehicle, a seat mounted on the seat-mounting means, instrumentalities enabling the seat and its mounting means to be adjusted into any desired position longitudinally of the floor, means for releasably securing the seat in adjusted position, and means for enabling rotation of the seat, and mechanism enabling the seat to be moved through a side door of the vehicle and extended to a position entirely exterior of the vehicle.

28. A device of the character described, comprising an assembly mounting adapted to be secured to the floor of a vehicle, the said assembly including a turntable, a frame mounted on the turntable adapted to be turned transversely of the vehicle in which the device is to be mounted, a platform mounted on the frame, means slidably securing the platform to the frame for enabling the platform to be extended and retracted relative to the frame, and means on the assembly for rigidly mounting a bed thereon, the said turntable defining an anchor for firmly supporting the frame together with the platform and mounted bed when in extended position.

29. In a device of the character described, the combination of track members adapted to be secured to the floor of a vehicle, a seat mounted on the track members, means for mounting the said seat on the track members for enabling the seat to be moved on the track members when installed in the vehicle, the mounting means for the seat including turning instrumentalities for enabling the seat to be turned transversely of the track, and extensible means anchored to the turning instrumentalities for enabling the seat to be moved to a position entirely exterior of the vehicle in which the device is mounted, while firmly supporting its seat in extended position.

30. In a vehicle, the combination of a vehicle body having a side opening and a floor, parallel track members secured to the floor and extending longitudinally of the body and within the said body, a platform assembly longitudinally disposed within the said body and slidably mounted on the track members for horizontal bodily movement within the said vehicle body, an extensible assembly mounted on the said platform assembly, the extensible assembly including riding means, a mounting plate for the riding means, and carrying a member slidably mounted on the said platform and supporting the said mounting plate, means for turning the said platform assembly laterally through the side opening to a position intermediate riding and extended positions, means for moving the said mounting plate and the riding means on the platform assembly to a fully extended position completely beyond the lines of the vehicle body, the said turning means defining anchoring instrumentalities for the platform assembly within the body, means exterior of the body for supporting the platform assembly externally of the vehicle, and collapsible supporting means for the extensible assembly and mounting plate becoming operative externally of the vehicle body when the extensible assembly is in extended position.

31. Mechanism adapted to be installed into the standard riding body of a conventional type of motor vehicle, which comprises guide members adapted to be mounted in the said compartment, a platform assembly adjustably positioned on the guide members for adjustment relative thereto, the platform assembly including a turntable for anchoring the assembly in the riding body when the assembly is mounted in the said body, the said assembly also including a section adapted to be shifted from a riding position within the compartment to a lateral position adjacent to a standard side door of the compartment while being maintained anchored by the turn-table, and a section extensibly mounted on the shiftable section adapted to be extended through the said door to a loading station remote from the compartment.

32. In a vehicle, the combination of a vehicle body having standard front and rear seats, a side door opening and a floor, guide members in the body, a platform assembly disposed longitudinally in the body at one side of the longitudinal axis of the body and movably mounted on the said guide members for horizontal bodily movement longitudinally within the vehicle body while continuously clearing the rear seat, the said platform assembly including a platform, means for turning the platform laterally through the side opening, means enabling the platform to be moved between a position within the body and a fully extended position completely away from the outside of the body, the said turning means defining anchoring instrumentalities for the said platform assembly within the body, and means carried by the platform assembly for firmly supporting the said assembly outside of the vehicle body when the assembly is in extended position.

33. In a vehicle, the combination of a vehicle body having a side opening and a floor, guide members in the body, a platform assembly disposed in the body and movably mounted on the guide members, the said platform assembly including a platform extensibly mounted on the remainder of the assembly, the assembly and platform being positioned normally entirely within the said body longitudinally thereof and at one side of the longitudinal axis of the body, turn-table means for anchoring one end of the assembly in the body while enabling the said platform to be moved through the side opening between the position entirely within the said body and an extended position completely outside of the said body and remote therefrom, the said platform assembly being anchored continuously within the body, and supporting means on the said assembly for firmly supporting the platform outside of the vehicle body when the platform is in extended position.

34. In a passenger motor car of a sedan type, a platform assembly mounted entirely within the usual passenger body, normally extending longitudinally of the body and disposed to avoid obstruction and reduction of the passenger capacity of the car, means within the car for anchoring the assembly interiorly of the car while enabling the assembly to be shifted within the car to a position adjacent to one of the standard side door openings of the car, a platform extensibly mounted on the assembly, means for extending the platform from the interior of the compartment through the door opening to a loading station completely outside of and remote from the said riding compartment while the platform is anchored continuously interiorly of the said compartment by the anchoring means, and means outside of the compartment for firmly supporting the platform when it is in its extended loading position completely remote from the riding compartment.

35. In a passenger motor vehicle of a sedan type, a standard passenger-transporting mechanism comprising a loading and riding platform shiftable between a riding position wholly within the vehicle which riding position avoids obstruction to the passenger space of the body when the platform is unloaded and also avoids reduction in amount of the said passenger space and a loading position completely remote from the vehicle, and anchoring means within the vehicle for continuously anchoring the said mechanism inside of the vehicle while allowing the platform to be shifted through a side door opening of the vehicle between riding and remote loading positions.

36. In a vehicle, the combination which comprises a vehicle body having a side opening, guide members in the body disposed longitudinally in the body at one side of the longitudinal axis of the body, a platform assembly disposed in the body and movably mounted on the guide members for horizontal bodily movement within the vehicle body, the said platform assembly including a platform extensibly mounted on the said assembly, and means enabling shifting of the platform through the side opening between a riding position wholly within the body and an extended loading position completely outside of and remote from the body.

37. In a sedan passenger automobile having standard doors, riding equipment, and front driving seat, the combination which comprises a platform assembly longitudinally disposed within the sedan body and supported on the floor thereof for bodily movement parallel to the said floor, the said platform assembly including a platform, mounting means carried by the platform and a front seat on the mounting means, the said assembly normally being positioned longitudinally in the sedan body with its longitudinal center line located at one side of the center line of the sedan body, so that the said assembly lies normally in the sedan body along a side thereof, and means for shifting the platform assembly between its normal position in the sedan body and an extended position laterally from the sedan body through a door thereof with the platform and seat thereof extended entirely beyond the said body, the shifting means enabling movement of the platform between riding and loading positions in a multiplicity of selected paths of movement enabling the platform when loaded to avoid engagement with normally obstructing elements of the vehicle body as the platform is moved through the said door.

38. In a sedan passenger-riding automobile having standard doors and riding equipment, the combination which comprises a platform assembly longitudinally disposed within the sedan body and supported on the floor thereof for bodily movement parallel to the said floor, the said platform assembly including a platform, mounting means carried by the platform, a front seat on the mounting means and means for receiving a stretcher assembly, the platform assembly being smaller than the stretcher assembly to be mounted thereon, the platform assembly normally being positioned longitudinally in the sedan body with its longitudinal center line located at one side of the center line of the sedan body, so that the said assembly lies normally in the sedan body along a side thereof, and means for shifting the platform assembly between its normal position in the sedan body and an extended loading position laterally from the sedan body through a door thereof with the platform and seat thereof extended entirely beyond the said body, the shifting means enabling movement of the platform between riding and loading positions in a multiplicity of selected paths of movement enabling the platform when loaded to avoid engagement with normally obstructing elements in the vehicle body as the platform is moved through the said door.

39. In a sedan passenger automobile having standard doors, riding equipment, rear seat, and front driving seat, the combination which comprises a platform assembly longitudinally disposed within the sedan body and supported on the floor thereof for bodily movement parallel to the said floor, the said platform assembly including a platform mounting means carried by the platform, a front seat on the mounting means and means for receiving a stretcher assembly, means normally positioning the platform assembly longitudinally within the sedan body with its longitudinal center line located at one side of, but parallel to, the center line of the sedan body so that the said assembly lies normally in the sedan body along a side thereof, the platform assembly being of a length substantially less than the width of the sedan body and clearing the rear seat therein, and means for shifting the platform assembly between its normal position in the sedan body and an extended loading position laterally from the sedan body through a door thereof with the platform and seat extended entirely beyond the said body for loading the stretcher assembly thereon, the shifting means enabling movement of the platform between riding and loading positions in a multiplicity of selected paths of movement enabling the platform when loaded to avoid engagement with normally obstructing elements in the vehicle body as the platform is moved through the said door.

40. In a sedan type automobile having a standard body, standard doors, and standard riding equipment, the combination which comprises a platform assembly longitudinally disposed on the floor of the body, and adapted to be shifted from riding position within the body and the loading position completely exterior of the body, the platform assembly being shiftable through one of the doors of the vehicle, and having its center of gravity when unloaded substantially coincident with the center of gravity of the vehicle in all positions of the platform thereby minimizing the amount of lift required for placing a load on the platform assembly when the said assembly is in loading position.

ARTHUR L. KOCH.
JOHN B. COVI.